United States Patent
Smith et al.

(10) Patent No.: US 8,434,426 B2
(45) Date of Patent: May 7, 2013

(54) PET TOILET

(76) Inventors: Matthew Livingston Smith, Arlington, VA (US); William Alan Armstrong, Alexandria, VA (US)

(*) Notice: Subject to any disclaimer, the term of this patent is extended or adjusted under 35 U.S.C. 154(b) by 111 days.

(21) Appl. No.: 13/184,065

(22) Filed: Jul. 15, 2011

(65) Prior Publication Data
US 2012/0012063 A1    Jan. 19, 2012

Related U.S. Application Data

(60) Provisional application No. 61/364,635, filed on Jul. 15, 2010.

(51) Int. Cl.
*A01K 1/01* (2006.01)

(52) U.S. Cl.
USPC .................................................. 119/163

(58) Field of Classification Search .......... 119/163, 119/162, 161, 164, 165, 479, 527; 4/300
See application file for complete search history.

(56) References Cited

U.S. PATENT DOCUMENTS

| | | | | |
|---|---|---|---|---|
| 2,584,656 A * | 2/1952 | Anderson | 119/162 |
| 3,747,563 A * | 7/1973 | Brockhouse | 119/163 |
| 3,964,437 A * | 6/1976 | Brown | 119/161 |
| 4,011,836 A * | 3/1977 | Temel | 119/163 |
| 4,196,693 A * | 4/1980 | Unversaw | 119/164 |
| 4,228,554 A * | 10/1980 | Tumminaro | 119/161 |
| 4,231,321 A * | 11/1980 | Cohen | 119/162 |
| 4,242,763 A * | 1/1981 | Walker | 119/164 |
| 4,262,634 A * | 4/1981 | Piccone | 119/162 |
| 4,502,413 A * | 3/1985 | Ponce et al. | 119/164 |
| 4,660,506 A * | 4/1987 | Nalven | 119/163 |
| 4,729,342 A * | 3/1988 | Loctin | 119/163 |
| 5,048,463 A * | 9/1991 | Wilson et al. | 119/163 |
| 5,289,799 A * | 3/1994 | Wilson | 119/164 |
| 5,640,928 A * | 6/1997 | Rymer | 119/162 |
| 5,785,000 A * | 7/1998 | Barbary | 119/166 |
| 6,014,946 A * | 1/2000 | Rymer | 119/162 |
| 6,119,629 A * | 9/2000 | Sicchio | 119/162 |
| 6,418,880 B1 * | 7/2002 | Chiu | 119/162 |
| 6,453,844 B1 * | 9/2002 | Janzen et al. | 119/163 |
| 6,457,435 B1 * | 10/2002 | Bridges | 119/163 |
| 6,769,382 B2 * | 8/2004 | Chiu | 119/162 |
| D533,974 S * | 12/2006 | Hirokawa et al. | D30/161 |
| 7,347,165 B2 * | 3/2008 | Yoerg | 119/671 |

* cited by examiner

*Primary Examiner* — Yvonne Abbott
(74) *Attorney, Agent, or Firm* — Novak Druce Connolly Bove + Quigg LLP

(57) ABSTRACT

A pet toilet providing a system where waste is "flushed" into a removable waste reservoir to eliminate waste and pet odors. The pet toilet can include a concave basin, a grating system, a removable water reservoir, and one or more flush tubes. The concave basin can be removably coupled to supporting legs, and can include a drainage hole. The grating system can include one or more grating sections disposed on the concave basin. The removable waste reservoir can be positioned beneath the concave basin and can include an opening aligned with the drainage hole of the concave basin. The removable water reservoir can be connected to one or more flush tubes via a valve. At least one of the one or more flush tubes can be coupled to the concave basin to expel water directly into the concave basin.

20 Claims, 5 Drawing Sheets

PET TOILET

CROSS-REFERENCE TO RELATED APPLICATIONS

This application claims the benefit of provisional patent application Ser. No. 61/364,635, filed Jul. 15, 2010, the entire content of which is incorporated herein by reference.

FIELD

The following relates to pet toilets, and more particularly to freestanding pet toilets.

BACKGROUND

Tending to household pets often requires scheduling, which may not be possible by a busy pet owner. Also, certain living arrangements, for example apartments without lawn areas or high-rise condo complexes, make tending to pets difficult and in extreme cases living arrangements can even make tending to pets unsafe. Additionally, walking pets at night requires pet owner to take on risks to self and to their pet. Additionally, older pets often lack the mobility necessary for efficient walking and may be unable to manage common obstacles, such as steps. Therefore, indoor pet toilet systems that conveniently dispose of pet waste are desirable.

Some toilet systems allow waste to accumulate in a removable tray. However, such a solution is not sanitary and also lends to difficult cleaning/removal of waste and distinct pet odors since waste sits in an open tray filled with waste and open to the environment. Other more complicated systems require connections to indoor plumbing or external water hoses to supply water and to eliminate waste. Neither of these types of systems is portable or practical for many apartment/condo dwelling pet owners that either do not have access to outdoor hoses or access or the right to alter indoor plumbing. Conventional systems are sub-optimal, uneconomical, or impractical.

Therefore, it would be desirable to provide an indoor pet toilet providing a system where waste is "flushed" into a sealed waste catchment basin to eliminate waste and pet odors and offer a higher degree of sanitation and odor removal.

SUMMARY

As introduced above, an indoor, portable, self-contained, flushing, and self cleaning pet waste system designed to eliminate odors, increase sanitation of indoor pet waste management, and offer pet owners a lifestyle free of being tied to a pet's schedule is provided, according to various embodiments. This system allows for benefits of the more complicated indoor plumbed system in a self-contained portable indoor system, which can be broken down, transported or stored for later use. All parts can be taken apart, cleaned, transported, stored, and used in any environment. Ideal for indoor, outdoor, patio and/or boat use. Embodiments of the device can feature a grating system having parallel bars, which offer better drainage and run off from liquid pet waste in comparison to cross-hatched grated systems. The grating system can also offer sufficient support to hold solid pet waste for easy removal. The grates can rest over a concave basin which channels water and liquid waste towards a trap door, which can be centrally located. In other embodiments both liquid and solid pet waste can be removed through the trap door. The concave basin can feature an inward opening drain and trap door which can be spring loaded to close off the basin after water has passed thus closing the system off from odors. The concave basin can channel waste and water into a removable catchment waste basin, which can be closed by an inwardly closing trap door to offer additional odor elimination and to prevent spillage. The waste catchment basin can be shaped with a thin neck and a wide base, incorporating a handle for easy removal. A lower center of gravity of waste catchment basin can allow for easy transport of the system toward appropriate waste removal via outdoor removal or indoor plumbing (for example, a conventional toilet). The system can feature a gravity-based or pump based flushing system that channels water from a reservoir, having a removable water container, through a tubing system. The tubing system can couple to the basin and port water unidirectionally around the basin. The unidirectional water flow can "flush" waste into the removable catchment container. The gravity system can use a removable water basin at the top of a water tower, which can use a pressure valve to aid in easy removal and off site filling. A separate water stream can spray over grates from a decorative spigot to wash the grate. All water can run down the basin, and pass through a trap door or valve into a waste catchment basin, keeping the system closed, thereby reducing odor, and increasing sanitation of waste removal process.

The catchment waste basin can be rounded and concave with a channel directing waste towards the waste basin. The catchment waste basin can be removable and can include a handle for easy removal. The gravity-based subsystem can contain a tower suspending, holding, or storing water in a container, which can deliver water, via tubing, piping, or otherwise, towards the catchment waste basin. The pump-based system can provide cleaning action via water pumped from container to basin. Both the pump and the gravity-based system can feature a pressure sensor and/or electronic sensor monitoring ingress and egress of animal, which can activate the flushing mode. Alternatively, a timing system can be employed, which washes the basin at predetermined times. To add weight and stability support legs can be filled with sand.

Many other aspects and examples will become apparent from the following disclosure.

BRIEF DESCRIPTION OF THE DRAWINGS

In order to further explain describe various aspects, examples, and inventive embodiments, the following figures are provided.

Figure 1:
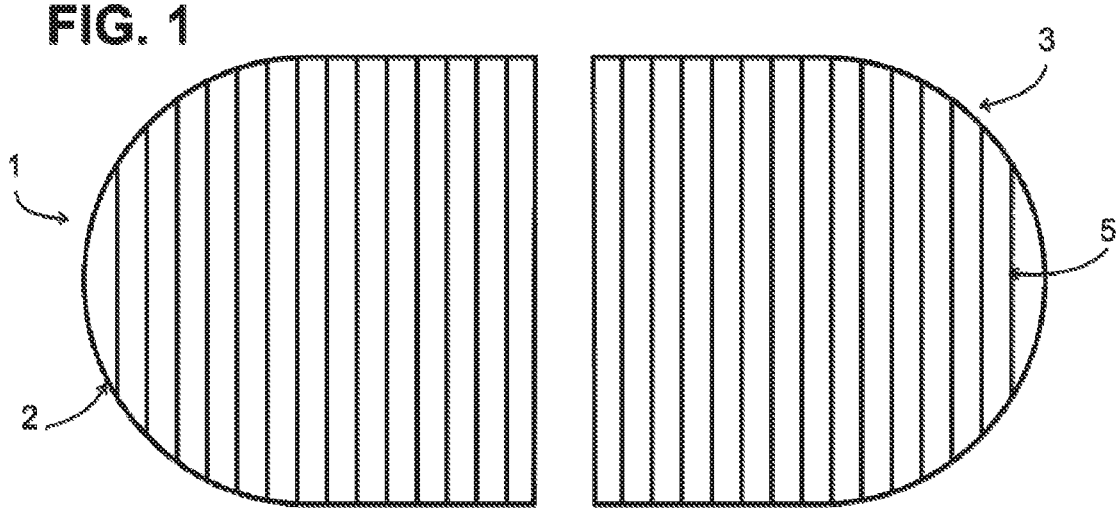
FIG. 1 depicts a schematic top view of a parallel tubular grating system in accordance with an exemplary embodiment.

It should be understood that the various embodiments are not limited to the arrangements and instrumentality shown in the drawings.

DETAILED DESCRIPTION

The functions described as being performed at various components can be performed at other components, and the various components can be combined and/or separated. All components described as being "removable" can be fixed in place. Other modifications can also be made.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. Numerical ranges include all values within the range. For example, a range of from 1 to 10 supports, discloses, and includes the range of from 5 to 9. Similarly, a range of at least 10 supports, discloses, and includes the range of at least 15.

Many other examples and other characteristics will become apparent from the following description.

Referring to FIG. 1, a schematic top view of a parallel tubular grating system is illustrated. The parallel tubular grating system 1 can be modular and removable. The grating system 1 can be made from plastic, rubber or a combination of both or any other suitable material capable of supporting a pet. The grating system can also be selected from a material comfortable to paws of pets and safe for repeated use. A tubular or ovaloid design aids in runoff of waste and reduces flat surface area. To further aid in waste runoff, the grating system 1 can be made from low surface tension plastic. The grating system 1 can include one or more grating sections. For example, as illustrated in FIG. 1, a grating system 1 can include a first grate section 2 and a second grate section 3. Each grating section 2, 3 can include a plurality of parallel rods 5. One or more of the rods 5 can be coated with plastic or resin to provide a soft coating that can provide cushioning to an animal's paws. The plurality of parallel rods 5 can occupy less surface area than a cross-hatched grate, thereby minimizing the amount of water or waste material that tends to sit on top of a grating section surface. The grating system 1, including the rods, can be made of any suitable material, for example, tubular metal or plastic. The grating system 1 can be removable, replaceable, or fixed in place. The grating system can be shaped to correspond to the shape of the removable basin described in FIG. 2.

Figure 2:
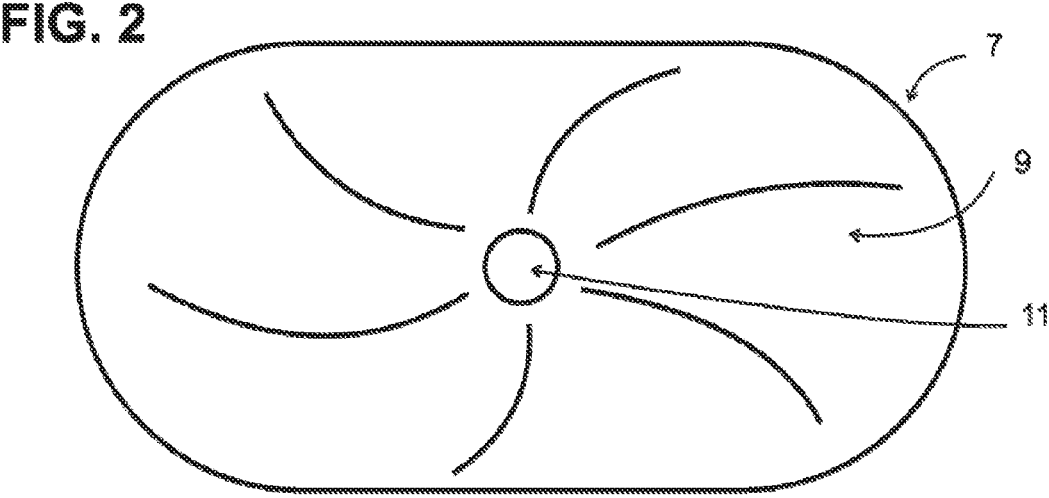
FIG. 2 depicts a schematic top view of a removable basin in accordance with an exemplary embodiment.

Referring to FIG. 2, a schematic top view of a removable basin 7 is illustrated. The removable basin 7 can have a concave surface 9, which can slope downwardly and inwardly toward the center of basin 7. Concave surface 9 can channel water into a gully system directing waste towards a removable waste catchment basin for improved hygiene. The concave surface 9 can descend from a rim of the basin 7 to a drainage hole 11. The concave surface 9 can allow water and/or liquid waste and/or solid waste to flow to drainage hole 11. The drainage hole 11 can be located, but not limited to the center of the removable basin 7. The removable basin 7 can be, but is not limited to being, oval in shape. The grating system 1 can sit above the removable basin 7 away from the flow of water.

Figure 3:
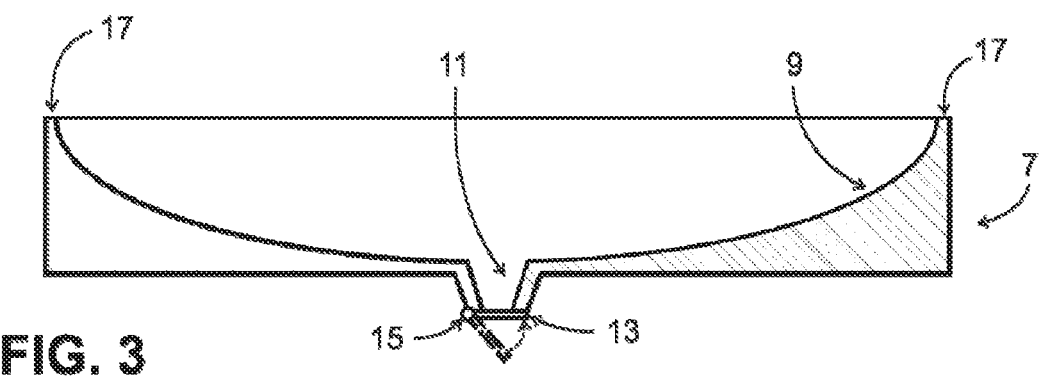
FIG. 3 depicts a schematic cross-sectional side view of a removable basin in accordance with an exemplary embodiment.

Referring to FIG. 3, a schematic cross-sectional side view of removable basin 7 is illustrated. The concave surface 9 of the removable basin 7 can curve toward the drainage hole 11. The drainage hole 11 can be shaped into a partial funnel shape as illustrated. An inwardly closing trap door 13 can be mounted at the base of drainage hole 11. The trap door 13 can be operated by a spring hinge 15 mounted to the removable basin 7. The trap door 13 can be automatically opened to allow liquid to flow through and automatically closed thereafter. The spring hinge 15 can be tensioned lightly enough such that the weight of the liquid and/or solid waste can open the trap door 13. After passing through the trap door 13, the spring hinge 15 can cause the trap door 13 to return to its closed position. Spring hinge 15 can be replaced or supplemented by a powered mechanism, such as a pneumatic or electronic actuator. The trap door 13 and/or a rubber valve can help contain odors and maintain a closed system for a more hygienic pet waste system. As previously discussed, the grating system 1 can be placed above the removable basin 7. One or more pressure sensitive devices 17 can be mounted on top of basin 7, in which case, the grating system 1 can rest on top of the pressure sensitive devices 17.

Figure 4:
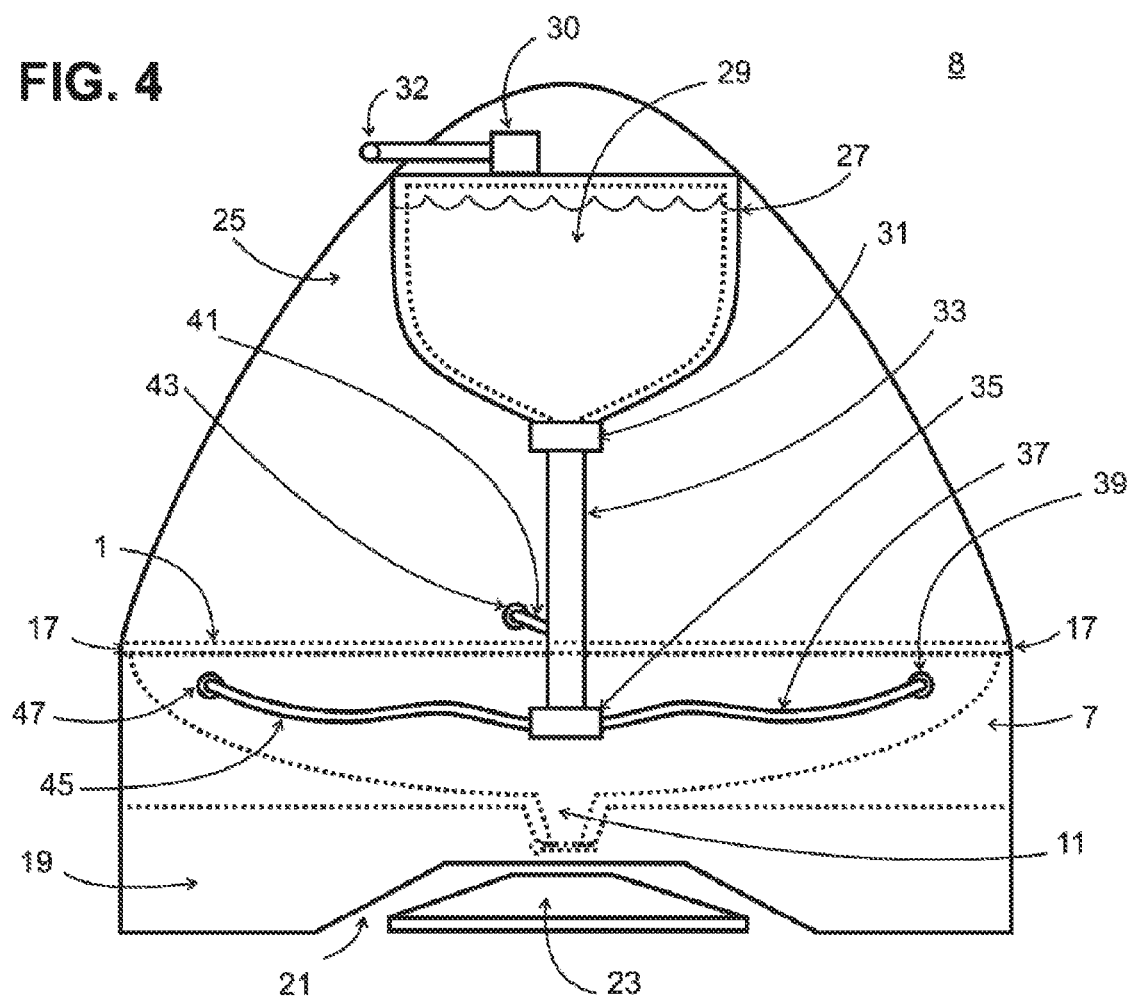
FIG. 4 depicts a schematic rear view of a pet toilet assembly in accordance with an exemplary embodiment.

Referring to FIG. 4, a schematic rear view of a pet toilet assembly 8 is illustrated. The removable basin 7 can be mounted on legs 19. The legs 19 can be attached to a backsplash 25. Legs 19 and/or backsplash 25 can support a removable water reservoir 27. Removable water reservoir 27 can be filled with water 29. The legs 19 can extend towards the rear of the pet toilet assembly 8 to act as a cantilever to assist in preventing the tipping of the pet toilet assembly 8 due to the weight of the water reservoir 27. The water reservoir 29 can be provided with a float valve 30 controlling the flow of refill water from water inlet 32. The base of the water reservoir 27 can connect to an automatic valve 31 for controlling the flow of water 29 from the reservoir 27. When the automatic valve 31 is opened water can flow by the force of gravity. A column 33 can extend from the automatic valve 31 to a base 35. The column 33 can be hollow.

Figure 8:
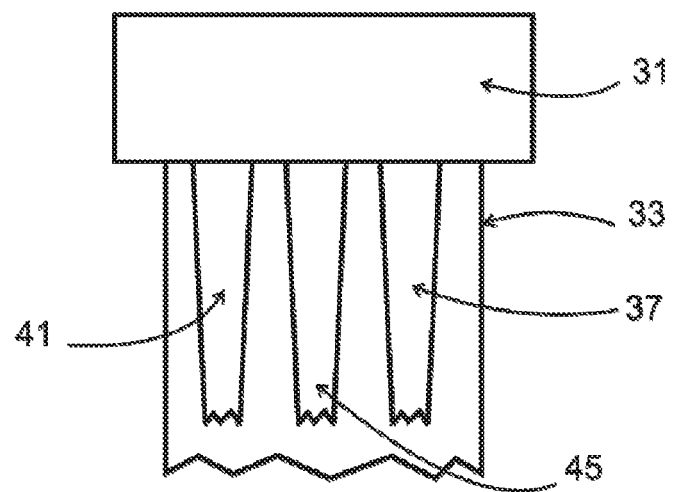
FIG. 8 depicts a schematic cross-sectional view of an automated or automatic valve and corresponding flush tubing in accordance with an exemplary embodiment.

In one embodiment, flush tubes couple to the column 33 or to the base 35. In another embodiment, the flush tubes extend through the base 35 and/or the column 33 and connect directly to automatic valve 31. (An embodiment where flush tubes are provided inside column 33 is illustrated in FIG. 8.) For example, a first flush tube 41 can be provided and can be coupled to a nozzle 43 extending through backsplash 25 at a point above grating system 1. One or more flush tubes 37, 45 can connect to one or more nozzles 39, 47 that extend through corresponding holes in the removable basin 7. The nozzles can be positioned or angled to force or spray water into the removable basin 7 in a circular motion. Multiple nozzles can be provided around the entire perimeter of basin 7. For example, four to six nozzles can be provided. The nozzles can be spaced at regular intervals around the concave surface 9 of basin 7. Nozzles are optional. The flush tubes 37, 45 can force water directly into or above the removable basin 7. In embodiments where nozzles are not used, the flush tubes 37, 45 can be provided with variable diameters. For example, a flush tube can have a large diameter at the point of connection with automatic valve 31, with column 33, or with base 35 and have a smaller diameter at the point of connection with the nozzle. The decrease in diameter can provide a higher flow rate and/or pressure through the tube terminus. The higher flow rate can provide a better cleansing force to remove waste materials from the grating system 1 and the removable basin 7. The flush tubes can be positioned or angled to force or spray water into the removable basin 7 in a circular motion.

Still referring to FIG. 4, pressure sensitive devices 17 can detect when pressure is applied or removed to the grating system 1, such as when an animal steps onto or off of grating system 1. When an animal steps off of grating system 1, pressure sensitive devices 17 can initiate the opening of automatic valve 29 to allow water 29 to flow through flush tubes 41, 45, and 37. Automatic valve 31 can remain open for a predetermined and/or adjustable period of time, for example, from 1 to 60 seconds, from 5 to 30 seconds, or from 5 to 10 seconds.

Still referring to FIG. 4, an opening 29 can be provided between legs 19 to allow a removable waste reservoir 23 to be positioned beneath draining hole 11.

Figure 5:
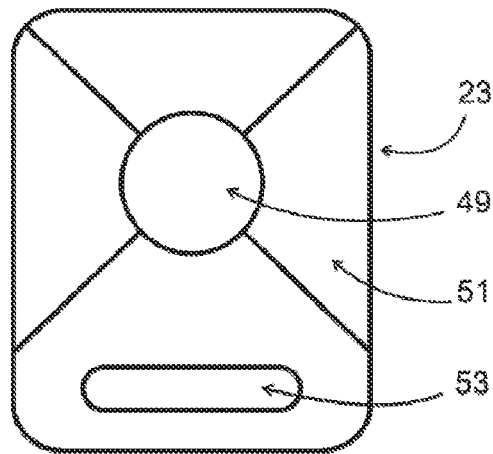
FIG. 5 depicts a schematic top view of a removable waste reservoir in accordance with an exemplary embodiment.

Referring to FIG. 5, a schematic top view of a removable waste reservoir is illustrated. Removable waste reservoir 23 can include a waste receiving hole 49, sloping walls 51, and a handle 53. Waste reservoir 23 can be constructed from any suitable material, for example, plastic. The sloping walls 51 and the hole 49 provide a funnel shape that channels liquid into the reservoir 23. Moreover, making waste reservoir 23 narrow at the top and wide at the bottom can provide a lower center of gravity to reduce backsplash while allowing for easy removal and transport. The handle 53 can provide easy retrieval from beneath the pet toilet assembly. The removable waste reservoir 23 can be sized to hold a larger volume of water than removable water reservoir 27 to prevent overflow. The removable waste reservoir 23 can also include a spring loaded trap door or valve system to allow for unidirectional water movement towards the resin or catchment basin, limiting odors and/or preventing the backflow of waste.

Figure 6:
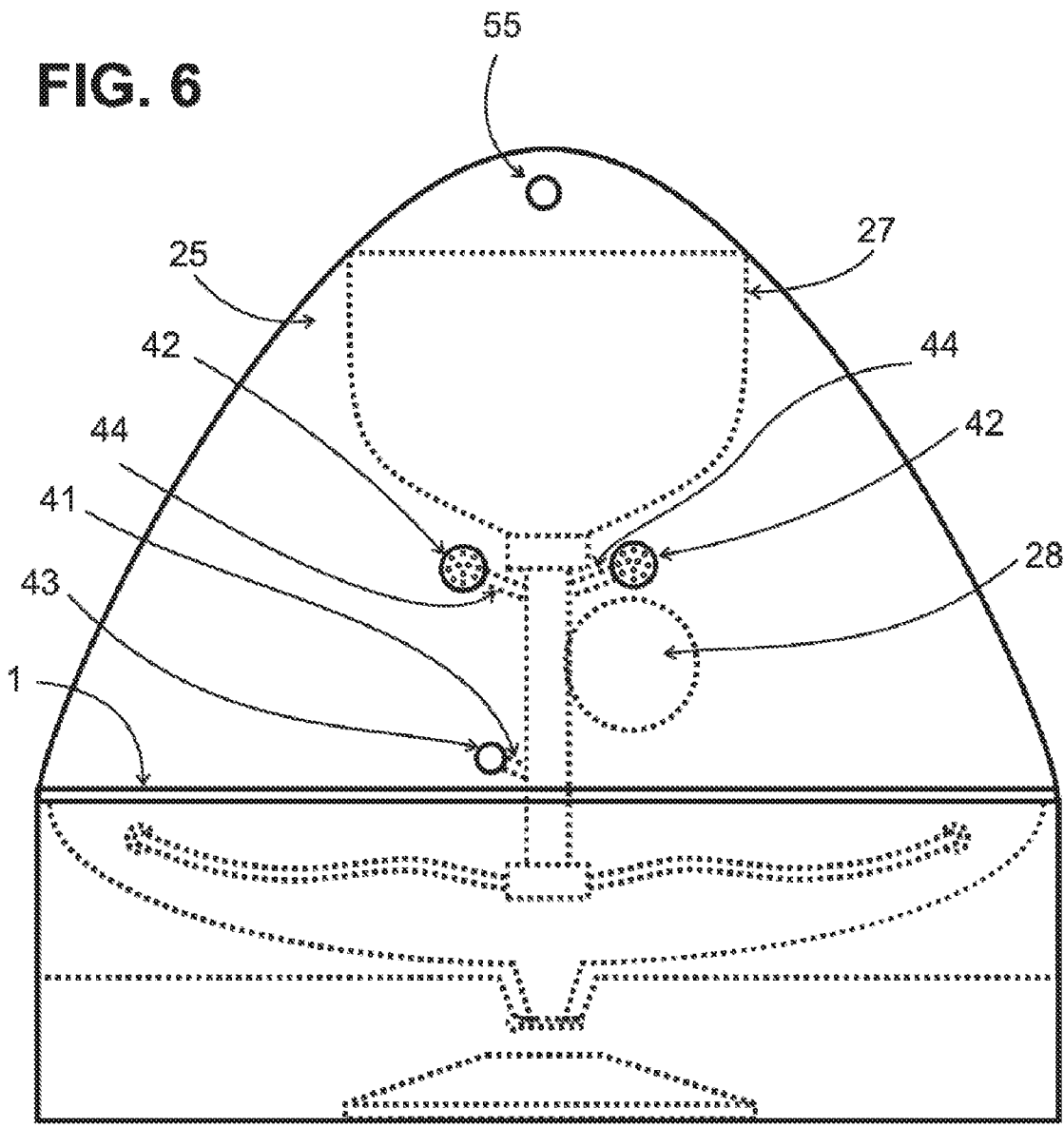
FIG. 6 depicts a schematic front view of a pet toilet assembly in accordance with an exemplary embodiment.

Referring to FIG. 6, a schematic front view of a pet toilet assembly is illustrated. From this perspective removable waste reservoir 27 is not visible, as it is positioned behind backsplash 25. As illustrated, flush tube 41 can be coupled to a nozzle 43 mounted in backsplash 25. The nozzle can be directed toward grating system 1 to wash waste material off of grating system 1. One or more flush tubes 44 can also be connected to one or more sprinkler heads 44. The one or more sprinkler heads 44 can expel water onto all or a portion of grating system 1 and/or onto all or a portion of backsplash 25. The one or more sprinkler heads 44 can also be positioned such that their water streams intersect. The water from the one or more sprinkler heads 44 can clean the top of grating system 1 and/or the surface of backsplash 25. As a substitute for or as a compliment to pressure sensitive devices 17, a sensor 55 can be mounted on the pet toilet assembly, for example on backsplash 25. The sensor 55 can be an optical sensor, and infrared sensor, a laser sensor, or any other type of sensor suitable to detect motion around grating system 1. When sensor 55 detects pre-defined types of motion around grating system 1, sensor 55 can prompt the opening of automatic valve 31 to allow water 29 to flow through flush tubes 41, 45, and 37. Automatic valve 31 can remain open for a predetermined period of time, for example, from 1 to 60 seconds, from 5 to 30 seconds, or from 5 to 10 seconds. A pump 28 can also be attached to any or all of the flush tubes or to column 33 to increase the water flow rate and/or pressure. The flush tubes can be any form of conduit, including tubing, piping and the like.

Figure 7:
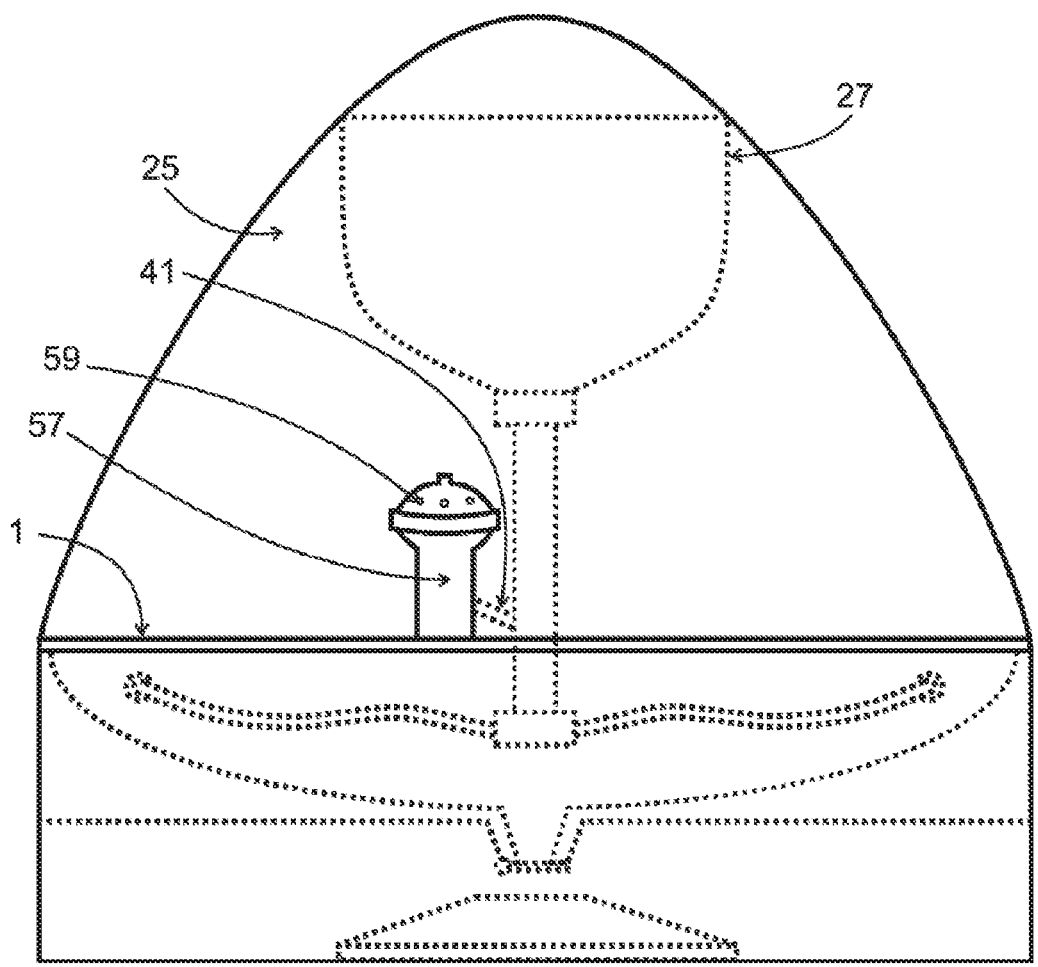
FIG. 7 depicts a schematic front view of a pet toilet assembly in accordance with an exemplary embodiment.

Referring to FIG. 7, a schematic front view of a pet toilet assembly is illustrated. Instead of nozzle 43, as illustrated in FIG. 6, flush tube 41 can be connected to a multi-directional nozzle assembly 57. The multi-directional nozzle assembly 57 can include one or more nozzles 59. Some nozzles 59 can be directed toward grating system 1, while others are pointed toward backsplash 25. Therefore, during a flush, water can rinse both the backsplash 25 and the grating system 1. The multi-directional nozzle assembly 57 can be provided with a decorative design, such as a fire hydrant. The multi-directional nozzle assembly 57 can provide an animal with a target. The multi-directional nozzle assembly 57 can be movable. Nozzle assembly 57 can also be rubbed with urine to facilitate training of an animal to urinate on the pet toilet assembly. The hydrant feature aids in dog attraction for easy training and also pumps water over grates for increased sanitation and removal of waste and odors.

Referring to FIG. 8, a schematic cross-sectional view of an automatic valve 31 and corresponding flush tubing 37, 41, and 45 is illustrated. Flush tubing 37, 41, and 45 can be coupled to automatic valve 31. Flush tubing 37, 41, and 45 can extend from automatic valve 31 into column 33. Flush tubing 37, 41, and 45 are illustrated with variable diameter, as discussed above, such that the diameters are largest at the point of connection with automatic valve 31.

Figure 9:
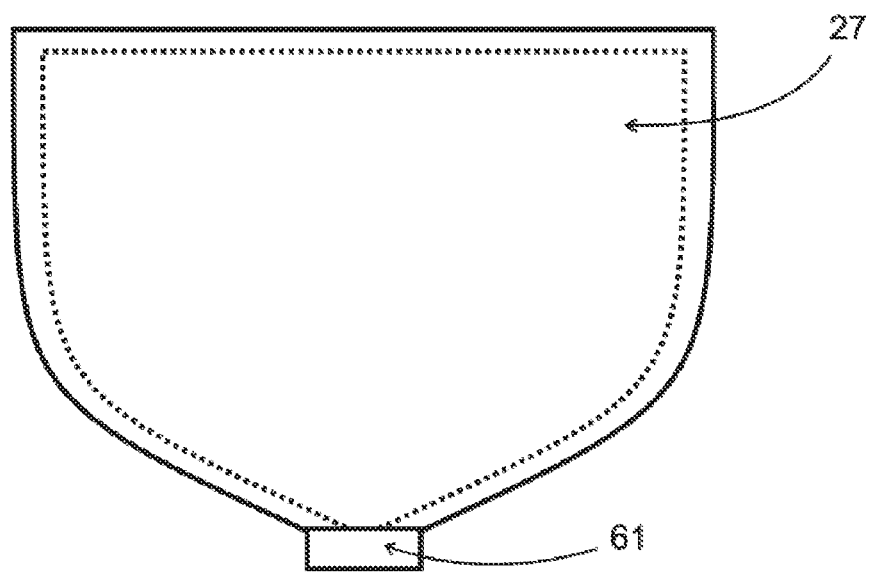
FIG. 9 depicts a schematic view of a removable water reservoir in accordance with an exemplary embodiment.

Referring to FIG. 9, a schematic view of a removable water reservoir 27 is illustrated. A spring-loaded valve 61 can be attached to the bottom of water reservoir 27, which allows for easy removal and refilling offsite from device. Removal of reservoir 27 from the pet toilet assembly closes valve 61 so that offsite filling can occur. Once reservoir 27 is mated to the assembly at automatic valve 31, one or more nipples can engage the valve 61 to allow water to flow. An alternate embodiment can use an automated and/or electronic system for the same. An electronic system can employ one or more batteries or an AC power supply.

Figure 10:
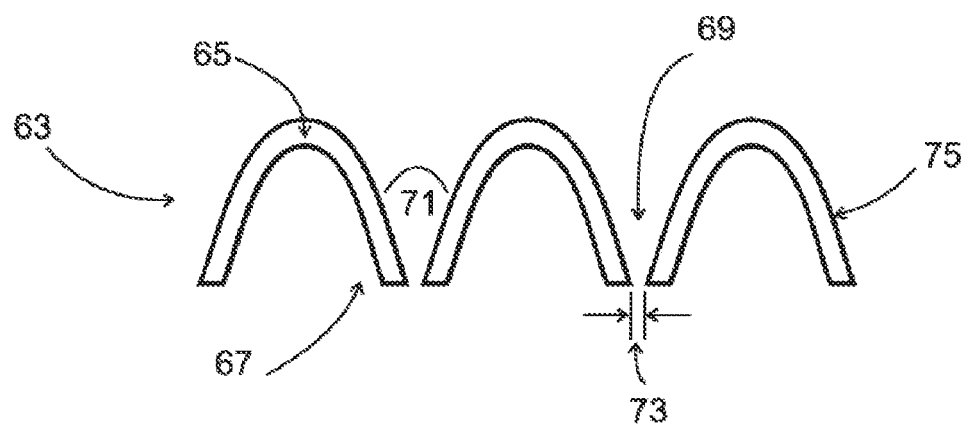
FIG. 10 depicts a schematic cross-sectional view of parallel angled grating that can be employed in the grating system in accordance with an exemplary embodiment.

Referring to FIG. 10, a schematic cross-sectional view of parallel angled grating that can be employed in the grating system is illustrated. A plurality of parallel grates 63 can be employed in grating system 1, as illustrated in FIG. 1. Each grate can have a top section 65 and a base section 67. The top section 65 can be rounded and can be narrower in width than base section 67 to provide sloping sidewalls 75. Sloping sidewalls 75 can help prevent an animal's claws from becoming trapped between parallel grates 63. Grates 63 can be spaced at regular intervals to provide a gap 69 between each grate 63. Gap 63 can provide a distance 73 between adjacent base sections 67. Distance 73 can be from about 0.01 to 1.0 inches, preferably from about ⅛ to ½ inch. Distance 73 and/or the shape of each grate 63 can be set to provide an angle 71 between adjacent grates of from about 5 to 175 degrees, preferably from about 30 to 45 degrees. The rounded, tapered shape provided by top section 65 and base section 67 combined with the regular spacing provided by gap 69 allows water to filter down between the parallel grates 63, but prevents an animal's claws from becoming trapped in the grate.

The spirit and scope of the appended claim should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

We claim:
1. A pet toilet comprising
   a concave basin removably coupled to supporting legs, the concave basin including a drainage hole;
   a grating system comprising one or more grating sections disposed on the concave basin;
   a removable waste reservoir positioned beneath the concave basin, the removable waste reservoir comprising an opening aligned with the drainage hole of the concave basin; and a removable water reservoir connected to one or more flush tubes via a valve, wherein at least one of the one or more flush tubes is coupled to the concave basin to expel water directly into the concave basin.

2. The pet toilet of claim 1, wherein the drainage hole is defined by a frustoconical extension, extending below a base portion of the concave basin.

3. The pet toilet of claim 2, further comprising an inwardly closing trap door mounted at a distal end of the frustoconical extension.

4. The pet toilet of claim 3, wherein the trap door is operated by a spring hinge mounted to the concave basin.

5. The pet toilet of claim 4, wherein the spring hinge is tensioned such that the weight of waste applied to the trap door causes the trap door to open, wherein the waste is selected from the group consisting of liquid pet waste, solid pet waste, and combinations thereof.

6. The pet toilet of claim 3, wherein the trap door is operated by a powered mechanism selected from the group consisting of a pneumatic actuator, an electronic actuator, and combinations thereof.

7. The pet toilet of claim 1, wherein the grating system comprises two independently removable grating sections.

8. The pet toilet of claim 1, wherein each of the one or more grating sections comprises a plurality of parallel rods.

9. The pet toilet of claim 8, wherein the plurality of parallel rods are coated with a coating selected from the group consisting of plastic, resin, and combinations thereof.

10. The pet toilet of claim 1, further comprising a backsplash extending above a rim of the concave basin.

11. The pet toilet of claim 1, further comprising a float valve positioned at the removable water reservoir and operable to open a water inlet to the removable reservoir when the water level in the removable water reservoir drops below a predefined limit.

12. The pet toilet of claim 1, further comprising an automatic valve at the base of the removable water reservoir, the automatic valve operable to control water flow from the removable water reservoir to the one or more flush tubes.

13. The pet toilet of claim 1, further comprising one or more nozzles coupled to the one of the one or more flush tubes.

14. The pet toilet of claim 13, wherein the one or more nozzles are positioned above the grating system.

15. The pet toilet of claim 14, wherein the one or more nozzles extend through a backsplash extending above a rim of the concave basin.

16. The pet toilet of claim 13, wherein the one or more nozzles are positioned below the grating system.

17. The pet toilet of claim 16, wherein a plurality of the nozzles are disposed around the perimeter of the concave basin.

18. The pet toilet of claim 1, further comprising a pressure sensitive device for detecting when pressure is applied to the grating system.

19. The pet toilet of claim 18, wherein the pressure sensitive device is operable to initiate the opening of an automatic valve at the base of the removable water reservoir, the automatic valve operable to control water flow from the removable water reservoir to the one or more flush tubes.

20. The pet toilet of claim 19, wherein the automatic valve remains open for a predetermined amount of time after being opened.

* * * * *